United States Patent
Fukuda et al.

(10) Patent No.: US 7,148,168 B2
(45) Date of Patent: *Dec. 12, 2006

(54) METHOD FOR PRODUCING ALUMINUM TITANATE SINTERED COMPACT

(75) Inventors: Tsutomu Fukuda, Kakogawa (JP); Masahiro Fukuda, Uji (JP); Masaaki Fukuda, Kakogawa (JP); Toshinobu Yoko, Uji (JP); Masahide Takahashi, Uji (JP)

(73) Assignee: Ohcera Co., Ltd., Osaka (JP)

( * ) Notice: Subject to any disclaimer, the term of this patent is extended or adjusted under 35 U.S.C. 154(b) by 29 days.

This patent is subject to a terminal disclaimer.

(21) Appl. No.: 10/511,272

(22) PCT Filed: Apr. 16, 2003

(86) PCT No.: PCT/JP03/04813

§ 371 (c)(1),
(2), (4) Date: Oct. 20, 2004

(87) PCT Pub. No.: WO03/091183

PCT Pub. Date: Nov. 6, 2003

(65) Prior Publication Data
US 2005/0181929 A1 Aug. 18, 2005

(30) Foreign Application Priority Data
Apr. 26, 2002 (JP) ............................... 2002-126553

(51) Int. Cl.
*C04B 35/478* (2006.01)
(52) U.S. Cl. ................... 501/134; 501/118; 501/127; 501/128
(58) Field of Classification Search ............... 501/118, 501/119, 127, 128, 134, 135, 136
See application file for complete search history.

(56) References Cited

U.S. PATENT DOCUMENTS

| 4,307,198 | A | * | 12/1981 | Oda et al. ................ 501/119 |
| 5,008,222 | A | * | 4/1991 | Kameda ................ 501/134 |
| 6,403,019 | B1 | * | 6/2002 | Fukuda et al. ............ 264/658 |
| 6,620,751 | B1 | * | 9/2003 | Ogunwumi ............... 501/134 |
| 2003/0015829 | A1 | * | 1/2003 | Fukuda et al. ............ 264/674 |
| 2004/0092381 | A1 | * | 5/2004 | Beall et al. .............. 501/134 |
| 2006/0009347 | A1 | * | 1/2006 | Fukuda et al. ............ 501/136 |

FOREIGN PATENT DOCUMENTS

| JP | 4-280863 | * | 10/1992 |
| JP | 2002-145659 | * | 5/2002 |

* cited by examiner

*Primary Examiner*—Karl Group
(74) *Attorney, Agent, or Firm*—Armstrong, Kratz, Quintos, Hanson & Brooks, LLP

(57) ABSTRACT

The present invention provides a raw material composition for preparing a sintered body of aluminum titanate, the composition comprising (i) 100 parts by weight of a mixture comprising 40 to 50 mol % of $TiO_2$ and 60 to 50 mol % of $Al_2O_3$, (ii) 1 to 10 parts by weight of an alkali feldspar represented by the formula: $(Na_xK_{1-x})AlSi_3O_8$ ($0 \leq x \leq 1$), and (iii) 1 to 10 parts by weight of at least one Mg-containing component selected from the group consisting of a Mg-containing oxide with spinel structure, $MgCO_3$ and MgO, and a process for preparing a sintered body of aluminum titanate comprising sintering a formed product prepared from the raw material composition at 1300 to 1700° C. According to the present invention, a sintered body of aluminum titanate having high mechanical strength and ability to be stably used at high temperatures, as well as its inherent properties of low coefficient of thermal expansion and high corrosion resistance, can be obtained.

5 Claims, 1 Drawing Sheet

METHOD FOR PRODUCING ALUMINUM TITANATE SINTERED COMPACT

TECHNICAL FIELD

The present invention relates to a raw material composition for preparing a sintered body of aluminum titanate, a process for preparing a sintered body of aluminum titanate, and a sintered body of aluminum titanate.

BACKGROUND ART

Sintered bodies of aluminum titanate have low coefficient of thermal expansion and high corrosion resistance. They are known as heat-resistant materials which exhibit low wettability with slag, excellent corrosion resistance, spalling resistance and other excellent properties when used as materials of, for example, containers, ladles, gutters, etc., for molten metals of aluminum, aluminum alloy, ferroalloy and the like. However, the sintered bodies of aluminum titanate, whose crystal grains constituting the sintered bodies are anisotropic, tend to suffer the following disadvantages: displacement at the crystal grain boundaries caused by stress due to the anisotropy of thermal expansion coefficient when heated or cooled; and formation of micro cracks and apertures which may lead to lowered mechanical strength.

Hence, conventional sintered bodies of aluminum titanate have insufficient strength, and can not exhibit sufficient durability particularly when high temperatures and heavy loads are applied thereto.

In addition, aluminum titanate is unstable at a temperature of 1280° C. or below. It tends to decompose into $TiO_2$ and $Al_2O_3$ when it is used in a temperature range of about 800 to 1280° C., and therefore is difficult to be used continuously in this temperature range.

To improve the sinterability of aluminum titanate and inhibit thermal decomposition, additives such as silicon dioxide are mixed with raw materials prior to sintering. In this case, however, the refractoriness of the resulting sintered bodies tends to be lowered. For this reason, it has been impossible to obtain a sintered body of aluminum titanate that has refractoriness so as to be usable at a temperature as high as about 1400° C. or higher and also has high mechanical strength.

DISCLOSURE OF THE INVENTION

A primary object of the present invention is to provide a novel sintered body of aluminum titanate having mechanical strength improved to a practically usable level and ability to be stably used at high temperatures as well as their inherent properties, i.e., low coefficient of thermal expansion and high corrosion resistance.

The inventors of the present invention carried out extensive research to overcome the foregoing problems. Consequently, the inventors found that when a raw material powder comprising titanium dioxide and alumina is sintered in the presence of a specific alkali feldspar and at least one component selected from the group consisting of a Mg-containing oxide with spinel structure, $MgCO_3$ and MgO, a sintered body of aluminum titanate with greatly improved mechanical strength, resistance to thermal decomposition and high refractoriness can be obtained without losing low thermal expansion inherent in aluminum titanate due to the synergistic effect of the Mg-containing component and alkali feldspar. The present invention was accomplished on the basis of this finding.

Specifically, the present invention provides the raw material composition for preparing a sintered body of aluminum titanate, process for preparing a sintered body of aluminum titanate and sintered body of aluminum titanate described below.

1. A raw material composition for preparing a sintered body of aluminum titanate, the composition comprising:
   (i) 100 parts by weight of a mixture comprising 40 to 50 mol % of $TiO_2$ and 60 to 50 mol % of $Al_2O_3$,
   (ii) 1 to 10 parts by weight of alkali feldspar represented by the formula: $(Na_xK_{1-x})AlSi_3O_8$ ($0 \leq x \leq 1$), and
   (iii) 1 to 10 parts by weight of at least one Mg-containing component selected from the group consisting of a Mg-containing oxide with spinel structure, $MgCO_3$ and MgO.

2. The raw material composition for preparing a sintered body of aluminum titanate according to item 1, wherein the alkali feldspar has such a composition that x in the formula: $(Na_xK_{1-x})AlSi_3O_8$ is in the range of $0.1 \leq x \leq 1$.

3. The raw material composition for preparing a sintered body of aluminum titanate according to item 1 or 2, wherein the molar ratio of Si in the alkali feldspar to Mg in the Mg-containing component is in the range of Si:Mg=0.9:1 to 1.1:1.

4. A process for preparing a sintered body of aluminum titanate, the process comprising sintering a formed product at a temperature of 1300 to 1700° C.
   the formed product being prepared from a raw material composition for preparing a sintered body of aluminum titanate comprising:
   (i) 100 parts by weight of a mixture comprising 40 to 50 mol % of $TiO_2$ and 60 to 50 mol % of $Al_2O_3$,
   (ii) 1 to 10 parts by weight of an alkali feldspar represented by the formula: $(Na_xK_{1-x})AlSi_3O_8$ ($0 \leq x \leq 1$), and
   (iii) 1 to 10 parts by weight of at least one Mg-containing component selected from the group consisting of a Mg-containing oxide with spinel structure, $MgCO_3$ and MgO.

5. A sintered body of aluminum titanate which is obtainable by the process of item 4.

The process for preparing a sintered body of aluminum titanate of the present invention is a process in which a composition prepared by blending a mixture comprising $TiO_2$ and $Al_2O_3$ with an alkali feldspar represented by the formula: $(Na_xK_{1-x})AlSi_3O_8$ ($0 \leq x \leq 1$) and at least one Mg-containing component selected from the group consisting of a Mg-containing oxide having spinel structure, $MgCO_3$ and MgO is used as a raw material; and a formed product prepared from this composition is sintered at a temperature of 1300 to 1700° C.

$TiO_2$ and $Al_2O_3$ used as the raw materials are not particularly limited insofar as they are substances from which aluminum titanate can be synthesized by sintering. Usually, they may be suitably selected from raw materials for producing various ceramics such as alumina ceramics, titania ceramics, aluminum titanate ceramics and so on.

The mixing proportion of $TiO_2$ and $Al_2O_3$ may be in a range of 40 to 50 mol % of $TiO_2$ and 60 to 50 mol % of $Al_2O_3$, preferably 45 to 50 mol % of $TiO_2$ and 55 to 50 mol % of $Al_2O_3$. In particular, adjusting the molar ratio of $Al_2O_3/TiO_2$ to 1 or higher within the mixing proportion mentioned above enables preventing coexistence of a liquid phase.

The alkali feldspar used as an additive is represented by the formula: $(Na_xK_{1-x})AlSi_3O_8$, in which $0 \leq x \leq 1$. In particular, in the above-mentioned formula, it is preferable that x is in the range of $0.1 \leq x \leq 1$, and is more preferable that x is in the range of $0.15 \leq x \leq 0.85$. The alkali feldspar having such a value range of x has a low melting point, and thus is particularly effective for promoting sintering of aluminum titanate.

The amount of the alkali feldspar used may be about 1 to 10 parts by weight, preferably about 3 to 4 parts by weight, per 100 parts by weight of the total amount of $TiO_2$ and $Al_2O_3$.

In the present invention, the Mg-containing oxide with spinel structure, $MgCO_3$ and MgO may be used singly or in combination of two or more kinds. Among these, examples of usable Mg-containing oxides with spinel structure include $MgAl_2O_4$, $MgTi_2O_4$ and the like. Natural minerals with spinel structure may be used as such oxides. Spinel oxides prepared by sintering a raw material comprising MgO and $Al_2O_3$ or raw material comprising MgO and $TiO_2$, etc. may be also used. In the present invention, two or more different kinds of oxides with spinel structure may be used in combination.

At least one Mg-containing component selected from the group consisting of a Mg-containing oxide with spinel structure, $MgCO_3$ and MgO may be used in an amount of about 1 to 10 parts by weight, preferably about 3 to 6 parts by weight, per 100 parts by weight of the total amount of $TiO_2$ and $Al_2O_3$.

In the process of the present invention, the molar ratio of Si in the alkali feldspar to Mg in the Mg-containing component is preferably in the range of Si:Mg=about 0.9:1 to about 1.1:1, more preferably in the range of Si:Mg=about 0.95:1 to about 1.05:1.

According to the process of the present invention, a sintered body of aluminum titanate with high mechanical strength, resistance to thermal decomposition and high refractoriness can be provided by mixing the above-mentioned Mg-containing component and alkali feldspar as additives with the mixture comprising $TiO_2$ and $Al_2O_3$, forming this mixture into a desired shapes and sintering the same.

The reason why the sintered body with high mechanical strength and resistance to thermal decomposition can be provided by the process of the present invention is undetermined, but is presumably as follows:

When aluminum titanate is synthesized by sintering, Si in the alkali feldspar dissolves into the crystal lattice and replaces Al. Since Si has a smaller ion radius than Al, the bond length with neighboring oxygen atoms is shortened. The obtained crystal will therefore have a smaller lattice constant than pure aluminum titanate. Accordingly, the resulting sintered body will have a stable crystal structure, improved mechanical strength and very high thermal stability, leading to greatly improved refractoriness.

Further, the use of the Mg-containing component as an additive enables obtaining compact sintered body. Therefore, it is possible to form a sintered body having much higher mechanical strength than pure aluminum titanate.

According to the process of the present invention, since the alkali feldspar and the Mg-containing component having such effects are used as additives in combination, it is presumed that Si contained in the alkali feldspar and Mg contained in the Mg-containing component replace mainly the Al sites in aluminum titanate. On the other hand, when each of these components is added singly, the Al sites, which originally keep their electrical charge balance by being trivalent, are replaced by either a divalent (Mg) or tetravalent (Si) element and thus the resulting sintered body needs to keep electrical balance. Therefore, in case where Mg is added, to keep the electrical charge balance, oxygen seems to be ejected from the system to cause oxygen deficient in the sintered body. In case of adding tetravalent Si, Ti, which is originally tetravalent, is assumedly reduced to be trivalent to keep the electrical charge balance. In the present invention, presumably, the electrical charge balance can be kept by adding the alkali feldspar and Mg-containing component in combination because Mg has a charge number smaller than Al by 1 and Si has a charge number larger than Al by 1, whereby these elements can dissolve into the sintered body without affecting the other elements constituting the sintered body. Particularly, when the amounts of the two additives are approximately equimolar, it is expected that the additives can exist more stably, compared to the case where they are added singly. For these reasons, it is presumed that a mechanical strength of the sintered body is greatly improved by synergistic effect between the two additives, compared to the case where they are used singly, whereby the sintered body of aluminum titanate having high mechanical strength exceeding practically usable level and very high refractoriness due to greatly enhanced resistance to thermal decomposition is formed without losing low thermal expansion that is inherent in aluminum titanate.

The raw material mixture comprising $TiO_2$, $Al_2O_3$, alkali feldspar and Mg-containing component may be sufficiently mixed, pulverized to a suitable particle size and then formed into a desired shape.

The process of mixing and pulverizing the raw material mixture is not particularly limited, and may be any known process, e.g., mixing and pulverizing by using a ball mill, stirred media mill, etc.

The degree of pulverization of the raw material mixture is not critical. Usually, the material is pulverized to a particle size of about 1 μm or less, preferably to as small particle size as possible, as long as secondary particles are not formed.

A forming aid may be added to the raw material mixture, if necessary. The forming aid may be selected from substances which have been heretofore used depending on the forming method.

Examples of such a forming aid include polyvinyl alcohol, microwax emulsion, carboxymethyl cellulose and like binders, stearic acid emulsion and like mold releasing agents, n-octyl alcohol, octylphenoxy ethanol and like antifoaming agents, diethylamine, triethylamine and like deflocculants, etc.

The amount of the forming aid used is not critical, and may be suitably selected within the range of the amount heretofore used for the forming aids depending on the forming method. For example, as a forming aid for slip casting, it is possible to use a binder in an amount of about 0.2 to 0.6 parts by weight, a deflocculant in an amount of about 0.5 to 1.5 parts by weight, a releasing agent (solid amount) in an amount of about 0.2 to 0.7 parts by weight, and an antifoaming agent in an amount of about 0.5 to 1.5 parts by weight, per 100 parts by weight the total amount of $TiO_2$ and $Al_2O_3$.

The method of forming the raw material mixture is not particularly limited and may be suitably selected from known forming methods such as press molding, sheet casting, slip casting, extrusion molding, injection molding, CIP molding, etc.

The sintering temperature may be about 1300 to 1700° C., preferably about 1350 to 1450° C.

The atmosphere for sintering is not particularly limited, and may be any of an oxygen-containing atmosphere such as air, a reducing atmosphere and an inert atmosphere, which are heretofore employed.

The sintering time is not particularly limited, and may be such that the product is sufficiently sintered depending on the shape of the formed product, etc. Usually, the sintering is conducted for about 1 to 10 hours while maintaining the temperature range mentioned above. The heating rate and cooling rate in sintering are not particularly limited, and may be suitably selected so that no cracks are formed in the sintered body.

The sintered body obtained by the process of the present invention has the features mentioned above; for example, high mechanical strength and low coefficient of thermal expansion at the same time. Further, the sintered body has excellent resistance to decomposition due to the stable crystal structure, and a high value of refractoriness. Accordingly, decomposition reaction of aluminum titanate is inhibited and the product can be stably used even at high temperatures such as a few hundred to about 1600° C. As for bending strength, a very high bending strength of over about 90 MPa, which is about 6 times higher than those of known sintered bodies of aluminum titanate, can be attained. In addition, according to the process of the present invention, sintering without the formation of cracks is possible so that the resulting sintered body becomes compact and has high resistance to thermal shock.

The sintered body prepared by the process of the present invention shows very high non-wettability and corrosion resistance against molten metal. As a result, it exhibits such excellent erosion resistance against flow of molten metal that could never be expected for known materials.

The sintered body of aluminum titanate of the present invention, utilizing its excellent features mentioned above, can be used for various applications, for example, containers for high-melting point metals such as crucibles for melting metals, ladles and gutters; components for high-temperature portions of aircraft jet engines; jet nozzles; components for high-temperature portions of various internal combustion engines such as glow plugs, cylinders and piston head; insulating and shielding plates for outer walls of spacecrafts, etc. Furthermore, it can be effectively used as a surface plate for printing processing in LSI manufacturing processes, etc., utilizing its low expansibility.

As can be seen from the above, the sintered body of aluminum titanate obtained by the producing process of the present invention has high mechanical strength and resistance to thermal shock, while maintaining the inherent low expansion coefficient of aluminum titanate. In addition, the sintered body of aluminum titanate has excellent resistance to decomposition, exhibits a high value of refractoriness, and can be stably used at high temperatures.

BEST MODE FOR CARRYING OUT THE INVENTION

Figure 1:
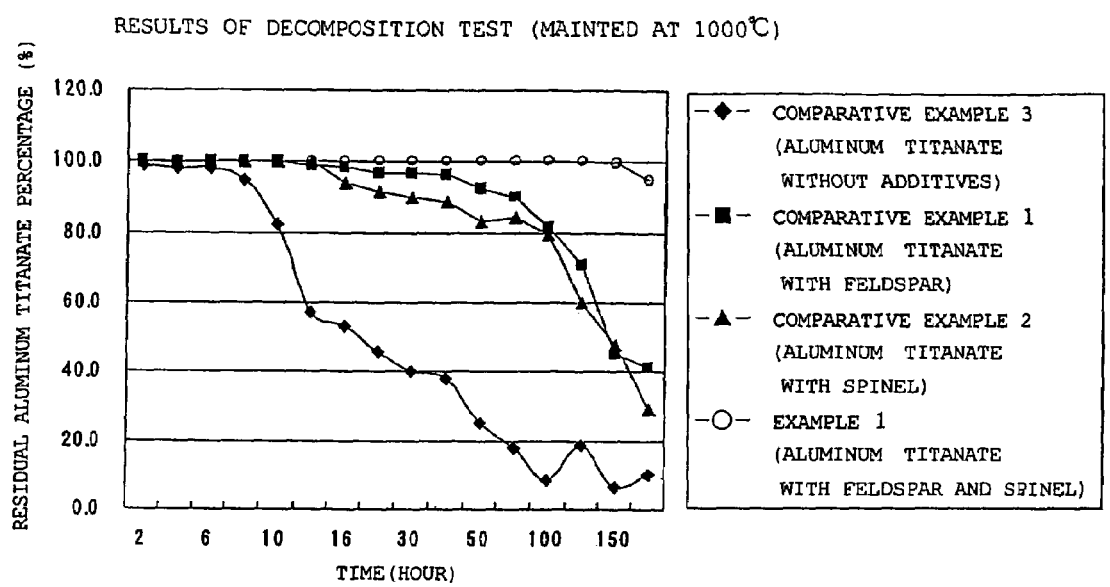
FIG. 1 is a graph showing the change of residual aluminum titanate percentage over time in the sintered body of aluminum titanate according to the present invention placed in the atmosphere at 1000° C.

The present invention is described below in more details with reference to the following examples.

EXAMPLE 1

To 100 parts by weight of a mixture comprising 43.9% by weight (50 mol %) of titanium oxide in anatase form and 56.1% by weight (50 mol %) of sinterable α-alumina were added 4 parts by weight of the alkali feldspar represented by the formula: $(Na_{0.6}K_{0.4})AlSi_3O_8$, 6 parts by weight of the spinel represented by the formula: $MgAl_2O_4$, 0.25 parts by weight of polyvinyl alcohol as a binder, 1 part by weight of diethylamine as a deflocculant and 0.5 parts by weight of polypropylene glycol as an antifoaming agent. The mixture was mixed using a ball mill for 3 hours and then dried using a dryer at 120° C. for 12 hours or more, giving a raw material powder.

The resulting raw material powder was pulverized to about 150 mesh and pressed under a pressure of 60 MPa, giving a molded product measuring 100 mm×100 mm×10 mm.

This molded product was sintered according to the heating pattern described below in the atmosphere and thereafter left to cool, giving a sintered body of aluminum titanate.

(Heating Pattern)
from 0 to 180° C. over 6 hours
maintained at 180° C. for 4 hours (water evaporation)
from 180 to 340° C. over 4 hours
maintained at 340° C. for 4 hours (organic binder combustion)
from 340 to 700° C. over 4 hours
maintained at 700° C. for 2 hours (residual carbon combustion)
from 700 to 1400° C. over 4 hours
maintained at 1400° C. for 4 hours A 5 mm×5 mm×20 mm sample was cut from the resulting sintered body. The surface of the sample was polished, and the coefficient of thermal expansion of the sample was determined at the heating rate of 20° C./min. The results are shown in Table 1 below.

TABLE 1

| Temperature (° C.) | Percentage of thermal expansion (ΔL/L) % | Average coefficient of thermal expansion (×$10^{-7}$/K) |
| --- | --- | --- |
| 126 | −0.016 | −15.55 |
| 226 | −0.029 | −14.26 |
| 326 | −0.036 | −12.13 |
| 426 | −0.040 | −10.10 |
| 526 | −0.039 | −7.87 |
| 626 | −0.033 | −5.47 |
| 726 | −0.014 | −2.07 |
| 826 | 0.012 | 1.55 |
| 926 | 0.035 | 3.85 |

As can be seen from the results shown above, the sintered body obtained by the process of the present invention has a low coefficient of thermal expansion and maintains the inherent low thermal expansibility of aluminum titanate.

EXAMPLE 2

A sintered body of aluminum titanate was obtained in the same manner as in Example 1 using the same raw material as that used in Example 1 except that the heating pattern in sintering was as described below.

(Heating Pattern)
from 0 to 180° C. over 6 hours
maintained at 180° C. for 4 hours (water evaporation)
from 180 to 340° C. over 4 hours
maintained at 340° C. for 4 hours (organic binder combustion)
from 340 to 700° C. over 4 hours
maintained at 700° C. for 2 hours (residual carbon combustion)

from 700 to 1350° C. over 4 hours
maintained at 1350° C. for 4 hours

A 3 mm×4 mm×40 mm sample was cut from the resulting sintered body of aluminum titanate. The surface of the sample was polished, and the sample was tested for its three-point bending strength.

For comparison, two control examples were prepared: a sintered body (Comparative Example 1) obtained by using the raw material having the same formulation as that used in Example 1 and sintering in the same manner as in Example 2 (sintering temperature: 1350° C.) except that no spinel was used and 4 parts by weight of alkali feldspar was used as an only additive; and a sintered body (Comparative Example 2) obtained by using the raw material having the same formulation as that used in Example 1 described above and sintering under the same conditions as in Example 2 (sintering temperature: 1350° C.) except that no alkali feldspar was used and 6 parts by weight of spinel was used as an only additive. These sintered bodies were tested for their three-point bending strength in the same manner. The results are shown in Table 2 below.

TABLE 2

| Sample name | Three point bending strength (MPa) |
| --- | --- |
| Example 2 (feldspar and spinel added) | 85.7 |
| Comparative Example 1 (feldspar added) | 56.0 |
| Comparative Example 2 (spinel added) | 30.3 |

As can be seen from the results shown above, the sintered body of aluminum titanate of Example 2 obtained by adding alkali feldspar and spinel at the same time has higher mechanical strength than the sintered bodies of aluminum titanate of Comparative Example 1 and Comparative Example 2 obtained by adding either alkali feldspar or spinel.

In addition, a sample measuring 10 mm×10 mm×10 mm was cut from each of the sintered bodies of aluminum titanate of Example 2, Comparative Example 1 obtained by adding alkali feldspar only and Comparative Example 2 obtained by adding spinel only. The samples were placed in the atmosphere at 1000° C., and the change of the residual aluminum titanate percentage over time was determined by X-ray diffraction method. The residual aluminum titanate percentage was calculated by measuring the diffraction intensity of the (110) and (101) faces of rutile, and determining the amount of rutile from the sum of their areas because aluminum titanate decomposes into alumina and rutile.

Further, the sintered body obtained by using the raw material having the same formulation as that used in Example 1 except that neither spinel nor alkali feldspar was added and sintering under the same conditions as in Example 1 (sintering temperature: 1400° C.) was tested for the change of the residual aluminum titanate percentage over time in the same manner. The results are shown as a graph in FIG. 1

As can be seen from FIG. 1, the sintered body of aluminum titanate of Example 2 was hardly decomposed into $TiO_2$ and $Al_2O_3$ when it was left at a high temperature for a long period. This demonstrates that it has excellent resistance to thermal decomposition.

The invention claimed is:

1. A raw material composition for preparing a sintered body of aluminum titanate, the composition comprising:
   (i) 100 parts by weight of a mixture comprising 40 to 50 mol % of $TiO_2$ and 60 to 50 mol % of $Al_2O_3$,
   (ii) 1 to 10 parts by weight of alkali feldspar represented by the formula: $(Na_xK_{1-x})AlSi_3O_8$ ($0 \leq x \leq 1$), and
   (iii) 1 to 10 parts by weight of at least one Mg-containing component selected from the group consisting of a Mg-containing oxide with spinel structure, $MgCO_3$ and MgO.

2. The raw material composition for preparing a sintered body of aluminum titanate according to claim 1, wherein the alkali feldspar has such a composition that x in the formula: $(Na_xK_{1-x})AlSi_3O_8$ is in the range of ($0 \leq x \leq 1$).

3. The raw material composition for preparing a sintered body of aluminum titanate according to claim 1 or 2, wherein the molar ratio of Si in the alkali feldspar to Mg in the Mg-containing component is in the range of Si:Mg=0.9:1 to 1.1:1.

4. A process for preparing a sintered body of aluminum titanate, the process comprising sintering a formed product at a temperature of 1300 to 1700° C.
   the formed product being prepared from a raw material composition for preparing a sintered body of aluminum titanate comprising:
   (i) 100 parts by weight of a mixture comprising 40 to 50 mol % of $TiO_2$ and 60 to 50 mol % of $Al_2O_3$,
   (ii) 1 to 10 parts by weight of an alkali feldspar represented by the formula: $(Na_xK_{1-x})AlSi_3O8$ ($0 \leq x \leq 1$), and
   (iii) 1 to 10 parts by weight of at least one Mg-containing component selected from the group consisting of a Mg-containing oxide with spinel structure, $MgCO_3$ and MgO.

5. A sintered alloy body of aluminum titanate which is obtainable by the process comprising sintering a formed product at a temperature of 1300 to 1700° C.,
   the formed product being prepared from a raw material composition for preparing a sintered body of aluminum titanate comprising:
   (i) 100 parts by weight of a mixture comprising 40 to 50 mol % of $TiO_2$ and 60 top 50 mol % $Al_2O_3$,
   (ii) 1 to 10 parts by weight of an alkali feldspar represented by the formula: $(Na_xK_{1-x})AlSi_3O_8$ ($0 \leq x \leq 1$), and
   (iii) 1 to 10 parts by weight of at least one Mg-containing component selected from the group consisting of a Mg-containing oxide with spinel structure, $MgCO_3$ and MgO, and the molar ratio of Si in the alkali feldspar to Mg in the Mg-containing component being in the range of Si:Mg=0.9:1 to 1.1:1.

* * * * *